(12) United States Patent
Gegenbauer et al.

(10) Patent No.: US 11,289,898 B2
(45) Date of Patent: Mar. 29, 2022

(54) SWITCH CABINET WITH PROTECTIVE SWITCH DEVICE

(71) Applicant: EATON INTELLIGENT POWER LIMITED, Dublin (IE)

(72) Inventors: Bernhard Gegenbauer, Waidhofen an der Thaya (AT); Georg Reuberger, Schweiggers (AT)

(73) Assignee: Eaton Intelligent Power Limited, Dublin (IE)

(*) Notice: Subject to any disclaimer, the term of this patent is extended or adjusted under 35 U.S.C. 154(b) by 277 days.

(21) Appl. No.: 16/467,125

(22) PCT Filed: Dec. 7, 2017

(86) PCT No.: PCT/EP2017/081807
§ 371 (c)(1),
(2) Date: Jun. 6, 2019

(87) PCT Pub. No.: WO2018/104440
PCT Pub. Date: Jun. 14, 2018

(65) Prior Publication Data
US 2019/0319449 A1    Oct. 17, 2019

(30) Foreign Application Priority Data
Dec. 9, 2016   (DE) .................. 10 2016 123 954.2

(51) Int. Cl.
*H02H 7/22* (2006.01)
*F16P 3/14* (2006.01)
*G01V 3/08* (2006.01)
*H02H 1/00* (2006.01)

(52) U.S. Cl.
CPC .............. *H02H 7/22* (2013.01); *F16P 3/14* (2013.01); *G01V 3/08* (2013.01); *H02H 1/0023* (2013.01)

(58) Field of Classification Search
CPC .......... H02H 7/22; H02H 1/0023; H02H 5/12; H02H 3/14; H02H 3/16; F16P 3/14
See application file for complete search history.

(56) References Cited

U.S. PATENT DOCUMENTS

| | | | |
|---|---|---|---|
| 6,549,385 B1* | 4/2003 | Bald ................. | H02H 5/12 361/42 |
| 6,897,783 B2* | 5/2005 | Zeng ................. | H02H 5/12 340/539.1 |
| 9,508,237 B1 | 11/2016 | Mercado et al. | |

(Continued)

FOREIGN PATENT DOCUMENTS

| | | |
|---|---|---|
| DE | 4438063 A1 | 5/1995 |
| SU | 1480797 A1 * | 5/1989 |

*Primary Examiner* — Adolf D Berhane
*Assistant Examiner* — Afework S Demisse
(74) *Attorney, Agent, or Firm* — Leydig, Voit & Mayer, LTD.

(57) ABSTRACT

An electrical installation includes: a switch cabinet; a protective switch arranged in the switch cabinet; and a cladding having electrical conductors and a voltage-measuring device/current-measuring device for measuring a current flowing through the electrical conductors, the voltage-measuring device/current-measuring device being operatively connected to the protective switch and being capable of triggering or switching off the protective switch when a measured value exceeding a threshold value is detected.

34 Claims, 5 Drawing Sheets

(56) References Cited

U.S. PATENT DOCUMENTS

2005/0264427 A1 12/2005 Zeng et al.
2010/0073013 A1* 3/2010 Zeller ................... H02H 3/044
                                                            324/551
2010/0133922 A1 6/2010 Payack

* cited by examiner

SWITCH CABINET WITH PROTECTIVE SWITCH DEVICE

CROSS-REFERENCE TO PRIOR APPLICATIONS

This application is a U.S. National Phase application under 35 U.S.C. § 371 of International Application No. PCT/EP2017/081807, filed on Dec. 7, 2017, and claims benefit to German Patent Application No. DE 10 2016 123 954.2 filed on Dec. 9, 2016. The International Application was published in German on Jun. 14, 2018 as WO 2018/104440 under PCT Article 21(2).

FIELD

The invention relates to an electrical installation with a switch cabinet and a protective switch arranged in the switch cabinet. The invention further relates to a method for securing such an electrical installation and operators situated in or near the electrical installation.

BACKGROUND

Such a device and method are generally known and are used, for example, to protect people and/or the installation itself from the destructive effects of an incident occurring in the installation or in the switch cabinet, or at least to mitigate its effects. For example, such an incident can be an excessively high operating current occurring in the installation or in the switch cabinet, a fault current due to faulty insulation or an arc (fault). For example, animals or falling tools as well as (damp) dirt can reduce the insulation or the spark gap between two conductors to different voltage potentials in such a way that a (fault) current flows or, in extreme cases, an arc can even occur. The latter can cause violent explosions due to the air heating up in a short time.

Electrical installations are therefore often monitored for the occurrence of such an arc fault, which in many cases is done by measuring the current flowing through the electrical conductors and by detecting the emitted light emanating from the arc. If both criteria are met, an alarm signal or a switching signal can be output for closing a low-impedance connection between said conductors at different voltage potentials, in particular a switch between these conductors. On the one hand, this has the effect that the arc is quickly extinguished, and on the other hand that very high currents occur in the supply lines, which can trigger a higher-level overcurrent switch, which ultimately disconnects the endangered point from the mains. Of course, the switching signal mentioned can also be used directly to open one or more switches in the supply lines to the arc.

Protective switches that trigger in the event of an overcurrent and/or a fault current are also known. The problem is that the operating currents occurring in larger electrical installations or switch cabinets naturally also permit higher fault currents. Although these are still within the normal range for the operation of the installation, they pose a risk to human health under certain circumstances.

SUMMARY

In an embodiment, the present invention provides an electrical installation, comprising: a switch cabinet; a protective switch arranged in the switch cabinet; and a cladding having electrical conductors and a voltage-measuring device/current-measuring device configured to measure a current flowing through the electrical conductors, the voltage-measuring device/current-measuring device being operatively connected to the protective switch and configured to trigger or switch off the protective switch when a measured value exceeding a threshold value is detected.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
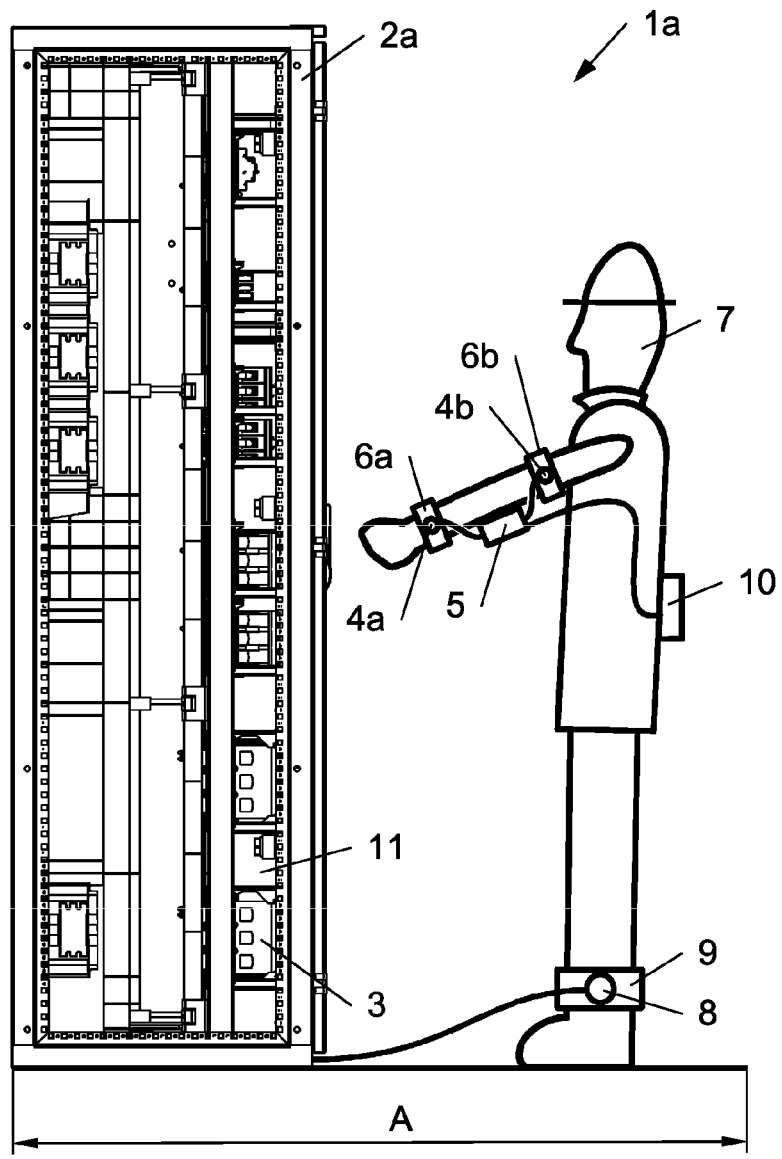
FIG. 1 is a schematic representation of an exemplary electrical installation having a voltage-measuring device which is operatively connected to a protective switch.

In an embodiment, the present invention provides an improved electrical installation and an improved method of operating such an installation. In particular, fault currents dangerous to humans can be detected and unnecessary dangers to humans avoided.

In an embodiment, the present invention provides an electrical installation of the type mentioned at the outset in which the electrical installation comprises a) two measuring electrodes having a voltage-measuring device arranged therebetween for measuring the voltage between the measuring electrodes and/or b) two measuring electrodes having a current-measuring device arranged therebetween for measuring the current flowing between the measuring electrodes and/or c) a cladding having electrical conductors and a current-measuring device for measuring the current flowing through said electrical conductors, the voltage-measuring device/current-measuring device is operatively connected to the protective switch and the voltage-measuring device/current-measuring device is designed to trigger or switch off the protective switch when a measured value exceeding a threshold value is detected.

In an embodiment, the present invention provides an electrical installation of the type mentioned at the outset in which
a) a voltage-measuring device of the electrical installation, which is arranged between two measuring electrodes and is operatively connected to the protective switch, determines the voltage between the measuring electrodes and/or b) a current-measuring device of the electrical installation, which is arranged between two measuring electrodes and is operatively connected to the protective switch, determines the current flowing between the measuring electrodes and/or c) a current-measuring device of the electrical installation, which is operatively connected to the protective switch, determines the current flowing through electrical conductors of a cladding and
the voltage-measuring device/current-measuring device triggers or switches off the protective switch when a measured value exceeding a threshold value is detected.

The proposed measures can be used to ensure that the fault current used to switch off or trigger a protective switch does not pose a health hazard for a person in or near the electrical installation. In particular, this switch-off can be based on a different (in particular a lower) fault current than a fault current which is permitted during normal operation of the electrical installation when a person is not present.

The fault current is determined in case a) by measuring the voltage between the measuring electrodes. The fault current flows through the person in the electrical installation, for example through their arm, and causes a voltage drop between the measuring electrodes due to the resistance of the human body (approx. 800 ohm). If the measured value, i.e. the measured voltage, exceeds a certain threshold value which is associated with a danger to humans from the corresponding fault current, the circuit from which the danger originates is disconnected from a supply voltage.

In case b), the measuring electrodes are electrically connected to each other, preferably by means of an electrical conductor whose resistance is lower than that of the human body. The fault current then flows at least between the two measuring electrodes mainly through the electrical conductor, which protects the person in the electrical installation.

The current-measuring device can have a current-measuring resistor which is electrically connected to the measuring electrodes or a ring-type transducer, which can also be designed as a current-measuring clamp. In the former case, the fault current is determined via the electrical voltage drop at the current-measuring resistor. In this case, the electrical installation basically has a voltage-measuring device. The boundaries between the voltage-measuring device and current-measuring device are therefore fluid. With the ring-type transducer, on the other hand, an electromagnetic field is determined which is caused by the current flowing between the measuring electrodes. With this measuring method, the connection between the two measuring electrodes can be designed to have a particularly low impedance.

In case c), a cladding worn by the person in the electrical installation has electrical conductors. For example, the cladding can be designed as a glove, jacket, overall, protective suit or as trousers, and the electrical conductors can be formed by electrically conductive wires, an electrically conductive braid and/or by an electrically conductive foil, in particular by metallic wires, a metallic braid and/or by a metallic foil or also by carbon wires, a carbon wire braid and/or by a carbon foil. The electrical conductors are incorporated into the cladding and preferably do not touch the skin of the person in the electrical installation. There is, for example, a layer of cotton fabric or another electrically insulating material between the skin and the conductors. Although insulation between the electrical conductors and the person is advantageous, the electrical conductors can nevertheless rest on the skin of the person in the electrical installation.

As in case b), the fault current flows mainly through the electrical conductors and only to a small extent through the person situated in the electrical installation, which in turn protects this person. The current itself can be measured by means of a current-measuring resistor connected to the electrical conductors of the cladding, or by means of a ring-type transducer measuring an electromagnetic field generated by a current flowing through the electrical conductors of the cladding.

The measures proposed in cases a) to c) can be applied individually or in combination in an electrical installation. It is particularly advantageous if cases a) and c) are combined or cases b) and c) are combined. In general, persons situated in an electrical installation should wear protective clothing, which can be equipped with electrical conductors as explained in case c). If the person touches conductive parts of the electrical installation, a fault current, as explained above, flows substantially through the electrical conductors of the protective clothing and only to a small extent through the body of the person situated in the electrical installation, thereby protecting this person. However, contrary to the recommendations or requirements of the operators of the electrical installations, the protective clothing is at times not worn. For example, protective gloves are taken off when work must be carried out that is difficult to do with gloves, such as adjusting or screwing in screws. If the worker touches electrically conductive parts of the electrical installation, the fault current cannot flow off through the (unworn) protective clothing but flows through the worker's body. The measures proposed in case a) or b), which also lead to a switch-off of the circuit from which the danger originates, are advantageous here. The electrical installation is therefore particularly safe.

Depending on whether a voltage-measuring device or a current-measuring device is used, the threshold value provided for triggering or switching off the protective switch is a voltage threshold value (if a voltage-measuring device is used) or a current threshold value (if a current-measuring device is used). In the scope of the disclosure, the term "threshold value" is used in a simplified form and can be replaced by the term "voltage threshold value" or "current threshold value" depending on the application.

In particular, the electrical installation can also be designed in such a way that
the protective switch has a switching input for triggering or switching off the protective switch,
the voltage-measuring device/current-measuring device has a switch output which is (operatively) connected to the switching input of the protective switch, and
the voltage-measuring device/current-measuring device is designed to change the state of the switch output when a measured value exceeding a threshold value is detected and to subsequently trigger or switch off the protective switch.

The electrical installation then comprises
a switch cabinet and
a protective switch arranged in the switch cabinet,
wherein
the electrical installation comprises a) two measuring electrodes having a voltage-measuring device arranged therebetween for measuring the voltage between the measuring electrodes and/or b) two measuring electrodes having a current-measuring device arranged therebetween for measuring the current flowing between the measuring electrodes and/or c) a cladding having electrical conductors and a current-measuring device for measuring the current flowing through said electrical conductors,
the voltage-measuring device/current-measuring device has a switch output which is connected to the switching input of the protective switch, and
the voltage-measuring device/current-measuring device is designed to trigger or switch off the protective switch when a measured value exceeding a threshold value is detected and to subsequently trigger or switch off the protective switch.

Accordingly, a method for securing an electrical installation comprising a switch cabinet and a protective switch arranged in the switch cabinet and having a switching input for triggering or switching off the protective switch is advantageous,
wherein
a) a voltage-measuring device of the electrical installation, which is arranged between two measuring electrodes, determines the voltage between the measuring electrodes and/or b) a current-measuring device of the electrical installation, which is arranged between two measuring electrodes and is operatively connected to the protective switch, determines the current flowing between the measuring electrodes and/or c) a current-measuring device of the electrical installation, which is operatively connected to the protective switch, determines the current flowing through electrical conductors of a cladding,
the voltage-measuring device/current-measuring device changes a state of the switch output of the voltage-measuring device/current-measuring when a measured value exceeding a threshold value is detected and
the switch output connected to the switching input of the protective switch triggers or switches off the protective switch when a measured value exceeding a threshold value is detected.

It is expedient if the protective switch is designed as a line protective switch, as an arc short-circuit switch or as a combined line and arc short-circuit switch. These switches are often already present in an electrical installation for other purposes and are used by the proposed system, resulting in a double benefit. "Line protective switches" are generally used to disconnect a circuit when an overload is detected. Overload usually occurs in the event of overcurrent, particularly in connection with a certain current rise, and/or in the event of overtemperature, i.e. thermal overload. "Arc short-circuit switches" are used to short-circuit two or more conductors at different voltage potentials (e.g. the phases and, where applicable, a neutral conductor) in order to extinguish a burning arc. Arc short-circuit switches are usually used in combination with an upstream line protective switch, creating a switch cascade. If the arc short-circuit switch is closed, such high short-circuit currents usually occur that the line protective switch is switched off or triggered as a result. The two switches can generally also be designed as combined line and arc short-circuit switches. The above-mentioned switching cascade can be effective, or both switches can also be actuated simultaneously in case of danger. An operative connection to the voltage-measuring device/current-measuring device can now be applied to a line protective switch and directly switch it off/trigger it, or the operative connection can also be applied to the arc short-circuit switch and close it in case of danger. The arc "simulated" in this way again leads to an upstream line protective switch triggering if it is not switched simultaneously with the arc short-circuit switch anyway (e.g. if a combined line and arc short-circuit switch is used). The voltage-measuring device/current-measuring device can thus be operatively connected to an arc fault protection system.

It is advantageous if the measuring electrodes in cases a) and b) are designed for attachment to the human body, in particular to the skin of the human body. Accordingly, to carry out the method disclosed, the measuring electrodes are attached to the human body, in particular to the skin of the human body, and in case a) the voltage drop between the measuring electrodes on said body or in case b) the current flowing between the measuring electrodes is detected. If a person (unintentionally) reaches onto parts of the electrical installation that carry a dangerous voltage, an electrical current flows through the human body, and in particular through the reaching arm, causing a voltage drop between the measuring electrodes due to the resistance of the human body (approx. 800 ohm). If the measured value (i.e. the measured voltage or the measured current) exceeds a certain threshold value which is associated with a danger to humans from the corresponding fault current, the circuit from which the danger originates is disconnected from a supply voltage as described above.

It is particularly advantageous if one electrode is arranged on each armband or leg band, or if both measuring electrodes are arranged at a distance from each other on a single armband or leg band. The former offers the advantage of better mobility, the latter leads to a known distance between the electrodes on the human body. Of course, the electrical installation can also have several pairs of electrodes, so that for example one worker can be equipped with several measuring electrodes, or so that several workers can be equipped with measuring electrodes.

In order that no dangerous voltage potentials can arise on said human body, it is advantageous if one of the two measuring electrodes in cases a) and b) is connected to an earth potential or said human body is connected to an earth potential by means of an earth electrode and/or in case c) the electrical conductors of the cladding are connected to an earth potential. Accordingly, it is also advantageous if, in cases a) and b), one of the two measuring electrodes is connected to an earth potential, or if the electrical installation has an earth electrode connected to an earth potential which is designed for attachment to the human body, in particular to the skin of the human body, and/or in case c) the electrical conductors of the cladding are connected to an earth potential. In particular, the earth electrode can in turn be arranged on an armband or a leg band.

It is generally advantageous if the measuring electrodes and/or the earth electrode are located on the inside of a cladding, in particular of a jacket, trousers, a shoe and/or a glove. In this way, both the worker and the measuring electrodes are well protected. In the region of the measuring electrodes and/or the earth electrode, tightening straps can be attached to the outside of the cladding in question so that the measuring electrodes and/or the earth electrode can be pressed firmly onto the skin of the human body. In this way, a kind of armband or leg band is created. The measuring electrodes, the bands, the electrical conductors in addition to the voltage-measuring device and the current-measuring device can, in particular, be part of the same cladding.

It is particularly advantageous if the electrical installation comprises
- at least one optical triggering device which is operatively connected to the protective switch and which is designed to trigger or switch off the protective switch when an arc is detected,
- a detection device for detecting an entry to or a request to enter a safe zone of the electrical installation and
- an electronic switch which is connected to the detection device and enables the protective switch to be triggered or switched off by the at least one optical triggering device when an entry or an entry request is detected, and otherwise prevents the protective switch from being triggered or switched off by the at least one optical triggering device.

Accordingly, it is also advantageous to use a method for securing an electrical installation which has at least one optical triggering device which is operatively connected to the protective switch and which triggers or switches off the protective switch when an arc is detected,
wherein
the protective switch is only triggered or switched off by the at least one optical triggering device when an entry to or a request to enter a safe zone of the electrical installation is detected.

In particular,
- the protective switch can have a switching input for triggering or switching off the protective switch,
- the at least one optical triggering device can have a switch output which is connected to the switching input of the protective switch, and
- the at least one optical triggering device can be designed to change the state of the switch output when an arc is detected and to subsequently trigger or switch off the protective switch.

A danger to a person can not only be caused by an excessively high fault current, but also, for example, by an arc (fault) occurring in the electrical installation. The measures proposed above protect a person not only from an excessive fault current but also from the harmful effects of an arc. As mentioned at the outset, the sometimes very high currents that occur in the event of an arc can lead to violent explosions due to the air heating up in a short time.

Usually, arc faults are detected by an optical triggering devices for switching off or triggering a protective switch which are permanently installed in the switch cabinet and monitor sensitive regions there. The light emitted from a monitored region can, for example, be guided to the optical triggering device via a light guide.

Also known are mobile optical triggering devices for switching off or triggering a protective switch. These are usually used temporarily and can also be arranged outside the switch cabinet. In particular, such an optical triggering device can be worn by a person in order to protect that person. If the optical triggering device worn by the person detects an arc, the protective switch is switched off or triggered and protects the person from the effects of the arc. In this way, for example, it is also possible to protect electrical installations or switch cabinets that otherwise have no protection if an arc occurs, or to protect regions of electrical installations or switch cabinets that otherwise have no protection if an arc occurs.

The problem in this case is that the optical triggering device arranged outside the switch cabinet is usually located in an environment which is difficult to assess. For example, incidents other than an arc can cause the protective switch to trigger falsely, such as bright flashes of light that are not dangerous in themselves.

An example of this is a flash of a photo camera with which a picture of the electrical installation is taken, as well as flickering lamps and the like. In addition, electric arcs can also occur in electrical installations during normal operation, for example in the form of switching arcs when disconnecting a live switching contact. The switching arc can be directly visible and/or luminous gas can escape from the switchgear from the burning switching contacts or from the arc deflector or arc quenching plates of the switchgear.

If the person looks in the direction of the flash of light in question, or if the mobile optical triggering device is aligned with it, the switchgear coupled or operatively connected to the optical triggering device is switched off/triggered, irrespective of whether the flash of light presents a potential danger and irrespective of whether the switchgear associated with the optical triggering device can influence the flash of light at all, i.e. extinguish it.

Under certain circumstances, such harmless triggers can have serious consequences, for example if the electrical installation is used to supply safety-critical loads that are switched off unnecessarily. For example, medical equipment, computer servers, technical equipment with unstable processes and the like.

The optical triggering device proposed above is used to prevent the optical triggering device from triggering a protective switch in a safe zone which does not pose any danger or in which there is no person in danger. As a rule, electrical installations also have passive protection, for example in the form of covers, housings, installations and cabinets. If a (fault) arc occurs in such a protected region, a person outside this region is generally not seriously endangered even if the arc is not or not immediately switched off. The measures proposed above then ensure that the optical triggering device only triggers a protective switch in a safe zone if the arc actually poses a danger to someone. For example, a switching arc inside a closed switch cabinet or at a sufficient distance is harmless in itself, but if the person's head, for example, is in the direct vicinity of the switching arc, this can have serious health consequences. The optical recognition of an arc as such is known per se and can be based, for example, on the intensity and/or spectral distribution of the received light.

It is particularly advantageous if the voltage-measuring device/current-measuring device and the optical triggering device are operatively connected to the same protective switch. The advantage of the proposed measures then becomes particularly apparent or a particular synergetic benefit is created, since a protective switch can be used to avert the danger of two different incidents. Moreover, it should not be forgotten that the protective switch, as mentioned at the outset, is often already present in an electrical installation anyway and switches off there, for example in the event of an overcurrent (line protective switch).

In principle, the optical triggering device could also be operatively connected to another protective switch than the voltage-measuring device/current-measuring device. In particular, line protective switches, arc short-circuit switches or combined line and arc short-circuit switches can be considered. It is also conceivable for the voltage-measuring device/ current-measuring device to be operatively connected to a first group of protective switches and the optical triggering device to a second group of protective switches. In particular, the two groups can also have an intersection.

In particular, g) the at least one optical triggering device can be designed for attachment to the human body, or h) the at least one optical triggering device is arranged in the switch cabinet or on the outside of the switch cabinet, or i) a first optical triggering device is designed for attachment to the human body and a second optical triggering device is arranged in the switch cabinet or on the outside of the switch cabinet.

In cases g) and i), the at least one (first) optical triggering device can, in particular, be arranged on a helmet, armband and/or cladding, specifically on a jacket. The optical triggering device can in this case be fixedly arranged, for example, on the helmet, the armband and/or on the cladding, or it can be temporarily mounted to the objects mentioned using a clip or Velcro strip, for example. Specifically, the optical triggering device can be arranged on the same armband/leg band or cladding as the voltage-measuring device/current-measuring device or on the same cladding, which is equipped with electrical conductors. In case h), the (second) optical triggering device can also have a clip or, for example, a magnet with which the optical triggering device can be attached to metallic components.

For the sake of completeness, it is noted that the term "entry" in the scope of the invention is synonymous with the term "access". This means that it is possible, but strictly speaking not necessary, to walk into a safe zone of the electrical installation in order to enter said safe zone.

It is also expedient if the electronic switch is designed as a logical AND conjunction of a positive arc signal from the optical triggering device and an entry signal from the detection device or acts as such and is operatively connected to the protective switch on the output side. The AND conjunction is therefore logically inserted between the protective switch and the optical triggering device. Accordingly, a positive arc signal from the optical triggering device and an entry signal from the detection device are linked logically with AND, and the protective switch is only switched off or triggered by the optical triggering device when an entry to or a request to enter the electrical installation is detected.

Moreover, it is advantageous if d) the detection device is designed to detect a closed state of a switch cabinet door and/or an entrance door to the electrical installation, in particular as a switching contact, and the electronic switch connected to the detection device is designed to enable the protective switch to be triggered or switched off by the at least one optical triggering device in the OPEN state of the switch cabinet door/entrance door and to prevent the protective switch from being triggered or switched off by the at least one optical triggering device in the CLOSED state of the switch cabinet door/entrance door and/or e) the detection device is designed as a manually actuatable entrance switch for the switch cabinet and/or for the electrical installation, and the electronic switch connected to the detection device is designed to enable the protective switch to be triggered or switched off by the at least one optical triggering device when the entrance switch is actuated and otherwise to prevent the protective switch from being triggered or switched off by the at least one optical triggering device and/or f) the detection device is designed to detect the presence of the at least one optical triggering device in a danger zone of the electrical installation, and the electronic switch connected to the detection device is designed to enable the protective switch to be triggered or switched off by the at least one optical triggering device when the optical triggering device is present in the danger zone and otherwise to prevent the protective switch from being triggered or switched off by the at least one optical triggering device.

In case d), entry or access is detected upon the opening of a door to the electrical installation or a switch cabinet door. In particular, the door to the electrical installation or the switch cabinet door is equipped with a switching contact. Alternatively or additionally, a manually actuatable entrance switch can be provided, the switching state of which is evaluated in order to enable the protective switch to be triggered or switched off by the at least one optical triggering device or not to enable this (case e). For example, the entrance switch can be coupled with a lock which locks a door to the electrical installation or a switch cabinet door. If the entrance switch is actuated, the lock opens, and the optical triggering device is also activated. This means that the protective switch can be switched off by the at least one optical triggering device. As a further alternative or additional possibility, it can be provided that the presence of the optical triggering device in a defined danger zone is checked. If the optical triggering device is in the danger zone, the protective switch can in principle be switched off by the at least one optical triggering device. If the optical triggering device is outside the danger zone, this is not possible.

In connection with the above-mentioned case f), it is particularly advantageous if the detection device is designed as a wireless detection receiver or is connected to a wireless detection receiver and is designed to detect the optical triggering device as being present in a danger zone when a transmission signal caused by the optical triggering device produces a reception field strength in the detection receiver which exceeds a field strength threshold value. Accordingly, the protective switch is only switched off or triggered by the optical triggering device when the optical triggering device is detected as being present in a danger zone, i.e. when a transmission signal caused by the optical triggering device produces a reception field strength in the detection receiver which exceeds a field strength threshold value. The danger zone in which the optical triggering device must be situated in order to trigger the protective switch need not necessarily correspond to the reception zone of a wireless receiver coupled to the switching input of the protective switch. For correct operation it is necessary for the reception zone of the receiver coupled to the protective switch to cover the danger zone, but the reception zone can also go beyond said danger zone.

It is also expedient if the electrical installation
  has an operating current-measuring device for measuring
    a current flowing through the protective switch or through the electrical installation, and
  an electronic switch which is connected to the operating current-measuring device and enables the protective switch to be triggered or switched off by the optical triggering device only if an operating current threshold value is exceeded by the measured current and/or if an increase threshold value of a time derivative of the measured current is exceeded.

It is therefore advantageous if the protective switch is triggered or switched off by the at least one optical triggering device only if a measured operating current through the protective switch or the electrical installation exceeds an operating current threshold value and/or the time derivative of the measured operating current exceeds an increase threshold value.

In this variant of the electrical installation, a second criterion is therefore used to classify an incident as an arc. In concrete terms, not only the light emitted by the arc is evaluated (namely by the optical triggering device), but also the current flowing through a protective switch or through the electrical installation. Consequently, a photo flash, for example, cannot cause the protective switch to switch off, as this does not cause an increase in current through the electrical installation. This significantly reduces the probability of false triggering.

It is expedient if the operative connection between the protective switch and the voltage-measuring device/current-measuring device and/or the optical triggering device is established wirelessly or by wire. In particular, it is advantageous if

- the switch output of the voltage-measuring device/current-measuring device/optical triggering device is designed as a wireless transmitter or is connected to a wireless transmitter,
- the switching input of the protective switch is designed as a wireless receiver or is connected to a wireless receiver and
- the wireless transmitter and the wireless receiver are designed to establish a wireless (operative) connection.

The wireless variant offers a particularly high level of convenience for the person present in an electrical installation, as they can move freely in the safe zone due to the wireless operative connection. Both radio connections and optical operative connections can be considered in this case. In principle, it is also possible for the switch output of the voltage-measuring device/current-measuring device/optical triggering device to be (operatively) connected electrically or by wire to the switching input of the protective switch. This variant somewhat restricts the freedom of movement of the person present in the safe zone but is particularly (fail-)safe.

Finally, it is expedient if the switch cabinet is designed for an operating current of at least 250 amperes and/or for a maximum operating voltage of 1000 VAC or 1500 VDC. These ranges are characterised by high-current installations or low-voltage installations. The arrangement presented is particularly suitable for this type of electrical installation.

At this point it is noted that the variants disclosed for the electrical installation and the resulting advantages equally refer to the operating method for the electrical installation and vice versa.

FIG. 1 shows an electrical installation 1a, comprising a switch cabinet 2a and a protective switch 3 arranged in the switch cabinet 2a. The switch cabinet 2a can in particular be designed for an operating current of at least 250 amperes and/or for a maximum operating voltage of 1000 VAC or 1500 VDC. Furthermore, the electrical installation 1a has two measuring electrodes 4a and 4b having a voltage-measuring device 5 arranged therebetween for measuring the voltage between the measuring electrodes 4a, 4b. The voltage measuring device 5 is operatively connected to the protective switch 3 and is designed to trigger or switch off the protective switch 3 when an overvoltage exceeding a threshold value is detected (case a).

The protective switch 3 can also have a switching input for triggering or switching off the protective switch 3. The voltage-measuring device 5 can have a switch output which is (operatively) connected to the switching input of the protective switch 3. If an overvoltage exceeding a threshold value is detected, the measuring device 5 changes the state of the switch output and subsequently triggers the protective switch 3.

The two measuring electrodes 4a, 4b are designed for attachment to the human body, in particular to the skin of the human body. In concrete terms, the first measuring electrode 4a is arranged on a first armband 6a and the second measuring electrode 4b on a second armband 6b, which are worn by a person 7. In principle, both measuring electrodes 4a, 4b could also be arranged at a distance from each other on a single armband. Alternatively, the measuring electrodes 4a, 4b could also be arranged on one or more leg bands. Two separate bands 6a, 6b offer the advantage of better mobility, a single band, on the other hand, has the advantage that the distance between the electrodes is predetermined and thus known.

So that no dangerous voltage potentials can arise on person 7, it is advantageous if this person—as shown in FIG. 1—is connected to an earth potential by an earth electrode 8. The earth electrode 8 is in turn designed for attachment to the human body, in particular to the skin of the human body, and, in the concrete case shown, is arranged on a leg band 9. Alternatively, the earth electrode 8 could also be arranged on an armband, specifically on the same armband 6a, 6b as the measuring electrode(s) 4a, 4b.

In general, it would also be conceivable for the measuring electrodes 4a, 4b and/or the earth electrode 8 to be arranged on the inside of a cladding, in particular of a jacket, trousers, a shoe and/or a glove. In this way, not only the worker 7 but also the measuring electrodes 4a, 4b and earth electrode 8 are well protected. In the region of the measuring electrodes 4a, 4b and/or the earth electrode 8, tightening straps can be attached to the outside of the cladding in question so that the measuring electrodes 4a, 4b and/or the earth electrode 8 can be pressed firmly onto the skin of the human body. In this way, a kind of arm or leg band is created.

In the example shown, the operative connection between the protective switch 3 and the voltage-measuring device 5 is established wirelessly. For this purpose, the switch output of the voltage-measuring device 5 is connected to a wireless transmitter 10 and the switching input of the protective switch 3 is connected to a wireless receiver 11. The wireless transmitter 10 and the wireless receiver 11 are designed to establish a wireless (operative) connection. In the example shown, a separate transmitter 10 and a separate receiver 11 are provided. It would also be conceivable for the transmitter 10 to be integrated into the voltage-measuring device 5 and/or for the receiver 11 to be integrated into the protective switch 3.

Although the wireless variant, which can, for example, be implemented optically or in a radio-based manner, offers a great deal of convenience and freedom of movement for the person 7, it is in principle also conceivable for the operative connection between the voltage-measuring device 5 and the protective switch 3 to be established by wire. For this purpose, the switch output of the voltage-measuring device 5 can be connected to the switching input of the protective switch 3 by a cable. This variant somewhat restricts the freedom of movement of the person 7 present in the safe zone but is particularly (fail-)safe.

To carry out the operating method, the voltage drop between the measuring electrodes 4a, 4b is now determined. If the person 7 (unintentionally) reaches onto parts of the electrical installation 1a which carry a dangerous voltage, an electrical current flows through the person 7, in particular through the reaching arm, causing a voltage drop between the measuring electrodes 4a, 4b due to the resistance of the human body (approx. 800 ohm). If the measured voltage or the fault current associated with this voltage exceeds a certain threshold value which poses a danger to the person 7, the circuit from which the danger originates is disconnected from a supply voltage by the protective switch 3.

Figure 2:
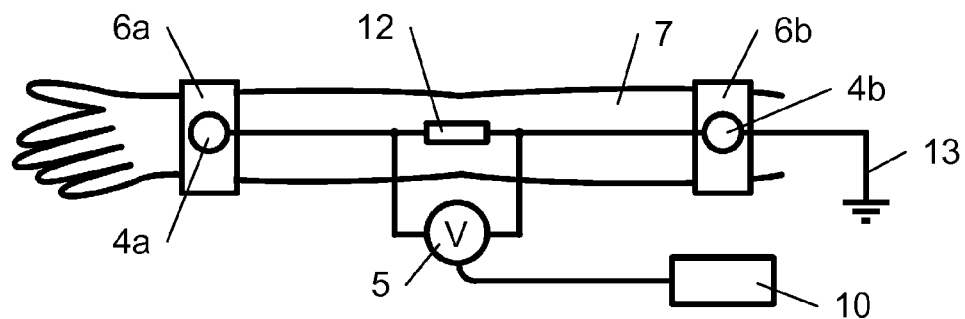
FIG. 2 shows a variant in which the measuring electrodes are electrically connected to each other with a current-measuring resistor.

FIG. 2 now shows a variant in which the measuring electrodes 4a, 4b are electrically connected to each other, specifically with a current-measuring resistor 12 (case b). The fault current is in this case determined via the electrical voltage drop at the current-measuring resistor 12, which is measured with the voltage-measuring device 5. The voltage-measuring device 5 is in turn connected to the wireless transmitter 10 and is thus operatively connected to the protective switch 3. Preferably, the electrical resistance of the current-measuring resistor 12 is lower than that of the human body. The fault current then flows at least between the two measuring electrodes 4a, 4b, mainly through the current-measuring resistor 12 and only to a small extent through the arm of the person 7 in the electrical installation 1a. In the example shown in FIG. 2, the second measuring electrode 4b is directly connected to an earth potential 13, so that no dangerous voltage potentials can arise on the person 7. It is of course also conceivable for a grounding electrode 8 to be used instead, as shown in FIG. 1.

Figure 3:
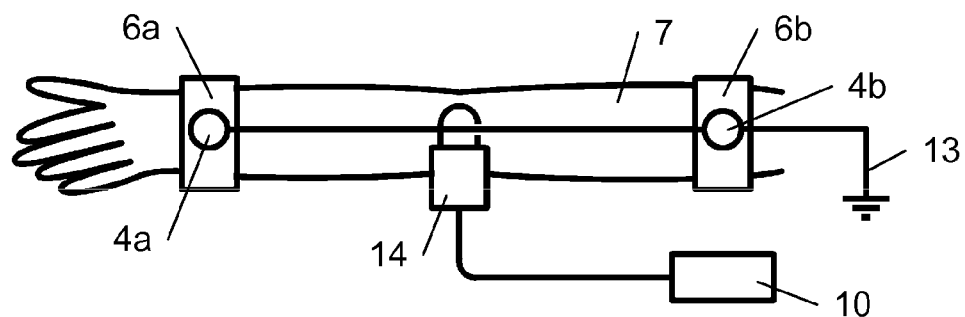
FIG. 3 shows a variant in which the measuring electrodes are electrically connected to each other and the current flowing between the measuring electrodes is determined using a ring-type transducer.

FIG. 3 shows a further example of case b) which is very similar to the example shown in FIG. 2. In contrast, however, no current-measuring resistor 12 is used, but the two measuring electrodes 4a, 4b are connected directly to an electrical conductor. In addition, the voltage-measuring device 5 is omitted, and instead a ring-type transducer 14 is used, which measures an electromagnetic field caused by the current flowing between the measuring electrodes 4a, 4b. If the measured fault current exceeds a certain threshold value which poses a danger to the person 7, the circuit from which the danger originates is again disconnected from a supply voltage by the protective switch 3. With this measuring method, the connection between the two measuring electrodes 4a, 4b can be designed to have a particularly low impedance, and hardly any current flows through the arm of the person 7 in the electrical installation 1a.

Figure 4:
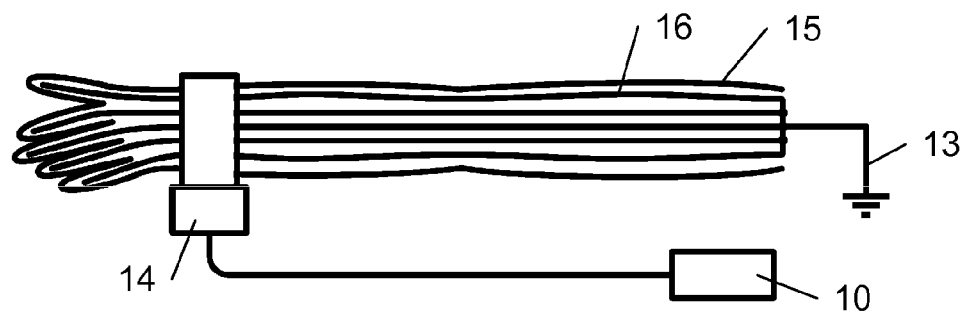
FIG. 4 shows an example of a cladding having electrical conductors and a ring-type transducer for determining the current flowing through said conductors.

FIG. 4 now shows an example of a cladding 15 which has electrical conductors 16 and which is worn by the person 7 in the electrical installation 1a (case c). FIG. 4 therefore does not directly show the arm of the person 7, but rather the cladding 15 covering the arm. In this specific case, the cladding 15 is designed as a long glove, although a combination of a short glove and the sleeve of a jacket could also be provided. In general, the cladding 15 can be designed as a glove, jacket, overall, trousers, shoe or protective suit.

In this case, the electrical conductors 16 are formed by electrically conductive wires running along the arm. The wires 16 can, for example, be metallic, designed as carbon wires or consist of a conductive plastic. The wires 16 are incorporated into the cladding 15 and preferably do not touch the skin of the person 7 in the electrical installation 1a. For example, between the skin and the wires 16 there is a layer of cotton fabric or another electrically insulating material. Although insulation between the wires 16 and the person 7 is advantageous, the wires 16 can nevertheless rest on the skin of the person 7 in the electrical installation 1a.

The fault current is measured using a ring-type transducer 14, which is, for example, arranged in the region of the wrist and in turn measures the electromagnetic field produced by a current flowing through the wires 16 of the cladding 15. Because the electrical resistance of the wires 16 is preferably significantly lower than the resistance of the human body, the fault current flows substantially through the wires 16 and only to a very small extent through the arm of the person 7, which is thus particularly well protected against the effects of a fault current. In this example, the wires 16 are in turn connected to an earth potential 13, so that no dangerous voltage potentials can arise on person 7.

Figure 5:
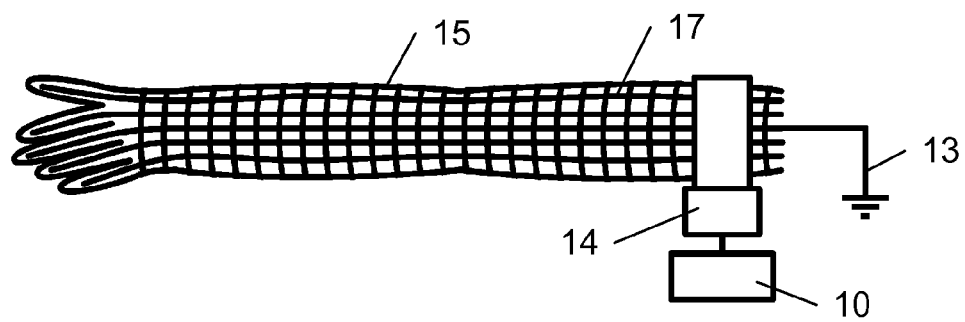
FIG. 5 is as FIG. 4, but with an electrically conductive braid.

FIG. 5 shows a further example of case c) which is very similar to the example shown in FIG. 4. In contrast, however, an electrically conductive braid 17 is incorporated into the cladding 15, which in turn can consist of metal, carbon or a conductive plastic. By way of example, the ring-type transducer 14 is arranged in the upper arm region, whereby fault currents can also be detected if, for instance, the elbow of the person 7 nudges against conductive parts of the electrical installation 1a. Of course, in the example shown in FIG. 5, the ring-type transducer 14 can also be arranged in the wrist region, and in the example shown in FIG. 4, the ring-type transducer 14 can be arranged in the shoulder region. Advantageously, the fault current is distributed better over the longitudinal wires by the braid 17. For the same purpose, instead of or in addition to the braid 17, or in addition to the wires 16 of the example shown in FIG. 4, an electrically conductive film, which in turn can consist of metal, carbon or a conductive plastic, can be incorporated into the cladding 15.

Figure 6:
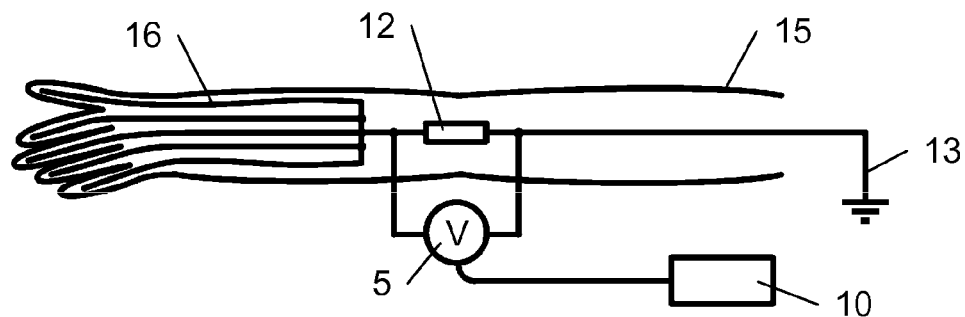
FIG. 6 shows an example of a cladding having electrical conductors and a current-measuring resistor for determining the current flowing through said conductors.

FIG. 6 shows a further example of case c) in which the conductive wires 16 are connected to a current-measuring resistor 12, which in turn is connected to an earth potential 13. The fault current is again determined using the electrical voltage drop at the current-measuring resistor 12, which is measured with the voltage-measuring device 5. Here, too, the electrical resistance of the current-measuring resistor 12 is preferably lower than that of the human body, so that the current flows mainly through the measuring resistor 12 and only to a small extent through the arm of the person 7 in the electrical installation 1a.

Figure 7:
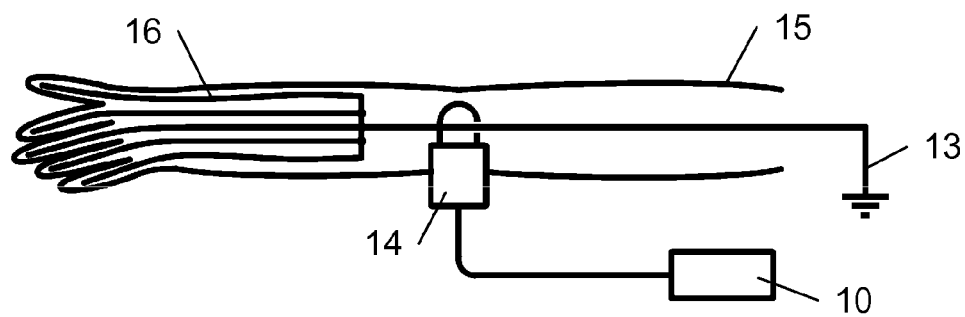
FIG. 7 shows a further example of a cladding having electrical conductors and a ring-type transducer for determining the current flowing through said conductors.

FIG. 7 finally shows an example of case c) in which the conductive wires 16 are connected to each other and directly to the earth potential 13. An electromagnetic field, which is caused by the current flowing to the earth potential 13, is in turn measured using the ring-type transducer 14. With this measuring method, the connection to the earth potential 13 can be designed to have a particularly low impedance, and hardly any current flows through the arm of the person 7 in the electrical installation 1a.

The measures proposed in cases a) to c) can be applied individually or in combination in an electrical installation 1a. It is particularly advantageous if cases a) and c) are combined or cases b) and c) are combined. In general, persons 7 in an electrical installation 1a should wear protective clothing equipped with electrical conductors 16, 17 as stated in case c). However, contrary to the recommendations or requirements of the operators of the electrical installations 1a, the protective clothing 15 is sometimes not worn, at least temporarily. For example, protective gloves 15 are removed when work must be carried out that is difficult to do with protective gloves 15, such as adjustment work or screwing in screws. If the worker 7 touches electrically conductive parts of the electrical installation 1a, the fault current cannot flow off through the (unworn) gloves 15 but flows through the body of the worker 7. The measures proposed in case a) or b) (see FIGS. 1 to 3), which also lead to a switch-off of the circuit from which the danger originates, are advantageous here. The electrical installation 1a is therefore particularly safe.

FIG. 1 shows only one person 7 having a pair of electrodes 4a, 4b and an earth electrode 8. Of course, the electrical installation 1a can also have several pairs of electrodes 4a, 4b and/or earth electrodes 8, so that for example one person 7 can be equipped with several pairs of electrodes 4a, 4b and/or earth electrodes 8, or so that several persons 7 can be equipped with pairs of electrodes 4a, 4b and/or earth electrodes 8. Similarly, the electrical installation 1a can comprise one or more of the items of protective equipment for one or more persons 7 shown in FIGS. 2 to 7, in particular, protective equipment of different types.

In general, the voltage-measuring device 5/current-measuring device 14 can be part of the cladding 15. For example, a ring-type transducer 14 can be incorporated into a glove.

In the examples shown in FIGS. 1 to 7, the fault current is measured on the arm of the person 7, in particular on the wrist of the person 7. In the same way, the measurement can be taken on another part of the body, for example on the leg or ankle of the person 7. In this case, the protective switch 3 is advantageously switched off/triggered not only when the person 7 touches conductive parts of the electrical installation 1a with their fingers or hand, but also when the person 7 touches conductive parts of the electrical installation 1a with their hip. It is advantageous in this context if the fault current is dissipated via the legs or feet of the person 7, which can be ensured in particular by connecting the legs or feet to the earth potential 13. For the above reasons, it can also be advantageous if the entire protective clothing 15 of the person 7 is equipped with electrical conductors 16, 17.

The protective switch 3 can be designed as a line protective switch, as an arc short-circuit switch or as a combined line and arc short-circuit switch. These switches are often already present in an electrical installation 1a for other purposes anyway and are used by the proposed system, which results in a double benefit.

Figure 8:
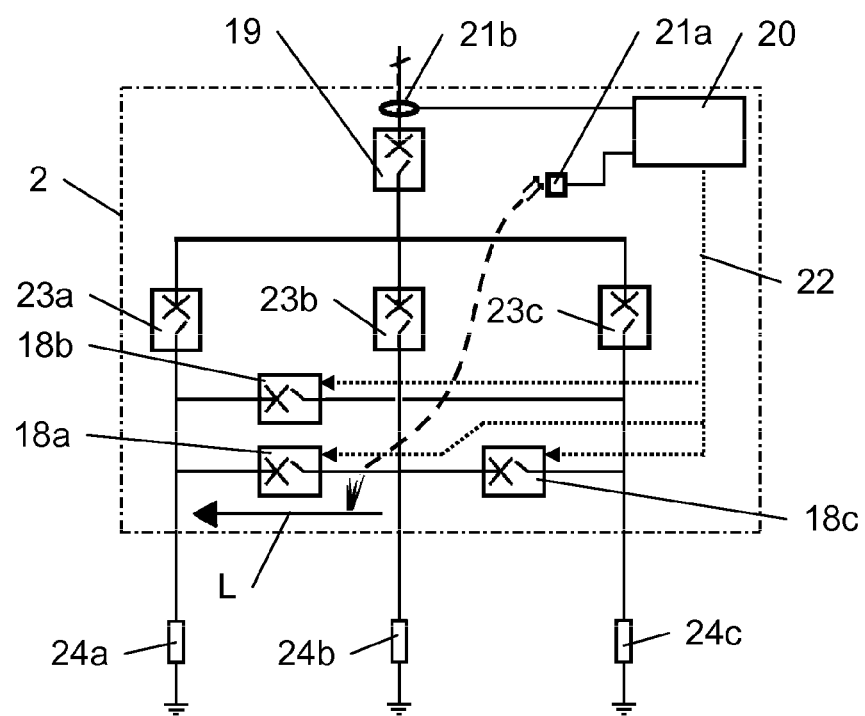
FIG. 8 shows an exemplary switching cascade having several arc short-circuit switches and higher-level line protective switches.

FIG. 8 shows the operating principle of a switching cascade which has several arc short-circuit switches 18a . . . 18c and a higher-level line protective switch 19. FIG. 8 also shows the purely symbolic example of the switch cabinet 2, having a device 20 for detecting an arc, which device is connected to a light-sensitive element 21a and a current-measuring device 21b or a ring-type transducer 21b. In addition, said device 20 has a switching output 22.

In addition to the higher-level line protective switch 19, optional line protective switches 23a . . . 23c, each assigned to one phase of a three-phase system, are provided. Finally, three loads 24a . . . 24c are also connected to the switch cabinet 2.

The functioning of the switching cascade is now explained using the example of an arc fault L burning between two phases:

A monitoring region is monitored for the occurrence of an arc L using the light-sensitive element 21a. If an arc L is detected, a switching signal is issued via the output 22, which signal is routed to the inputs of the arc short-circuit switches 18a . . . 18c. As a result of the switching signal, the arc short-circuit switches 18a . . . 18c are closed and thus extinguish the arc L burning between the phases. The overcurrent caused by the short-circuit subsequently triggers the higher-level line protective switch 19 or the line protective switches 23a . . . 23c, whereby the circuit in question is finally disconnected from the current mains.

It is of course also conceivable for the line protective switch 19 and/or the line protective switches 23a . . . 23c not to trigger due to the overcurrent, but as a direct result of the signal at the output 22, which is then also routed to the inputs of the line protective switch 19 and/or the line protective switches 23a . . . 23c.

In the present case, not only the signal from the light-sensitive element 21a is used to decide whether an arc L is present or not, but also the current measured by the current-measuring device 21b. According to this method, an arc L is present when bright light is measured by the light-sensitive element 21a AND when the operating current measured by the current-measuring device 21b exceeds an operating current threshold value. The current-measuring device 21b thus acts as an operating current-measuring device 21b. Of course, additional or other criteria can also be used to determine whether an arc L is present or not.

The voltage-measuring device 5/current-measuring device 14 of FIGS. 1 to 7 can now be operatively connected to the line protective switch 19/the line protective switches 23a . . . 23c directly and control it/them. The voltage-measuring device 5/current-measuring device 14 can, however, also be connected to the arc short-circuit switches 18a . . . 18c and control them, provided that arc short-circuit switches 18a . . . 18c are installed in the switch cabinet 2. In this case, the line protective switches 19, 23a . . . 23c can be triggered indirectly by the cascade effect described above, or the line protective switches 19, 23a . . . 23c are also controlled directly by the voltage-measuring device 5/current-measuring device 14. The voltage-measuring device 5/current-measuring device 14 can thus be operatively connected to an arc fault protection system.

In the example shown, a higher-level line protective switch 19 as well as line protective switches 23a . . . 23c which are each assigned to one phase of a three-phase system are provided. Where the arrangement has the same or a comparable function, it is possible for only the higher-level line protective switch 19 to be provided or only the line protective switches 23a . . . 23c which are each assigned to one phase of a three-phase system.

Figure 9:
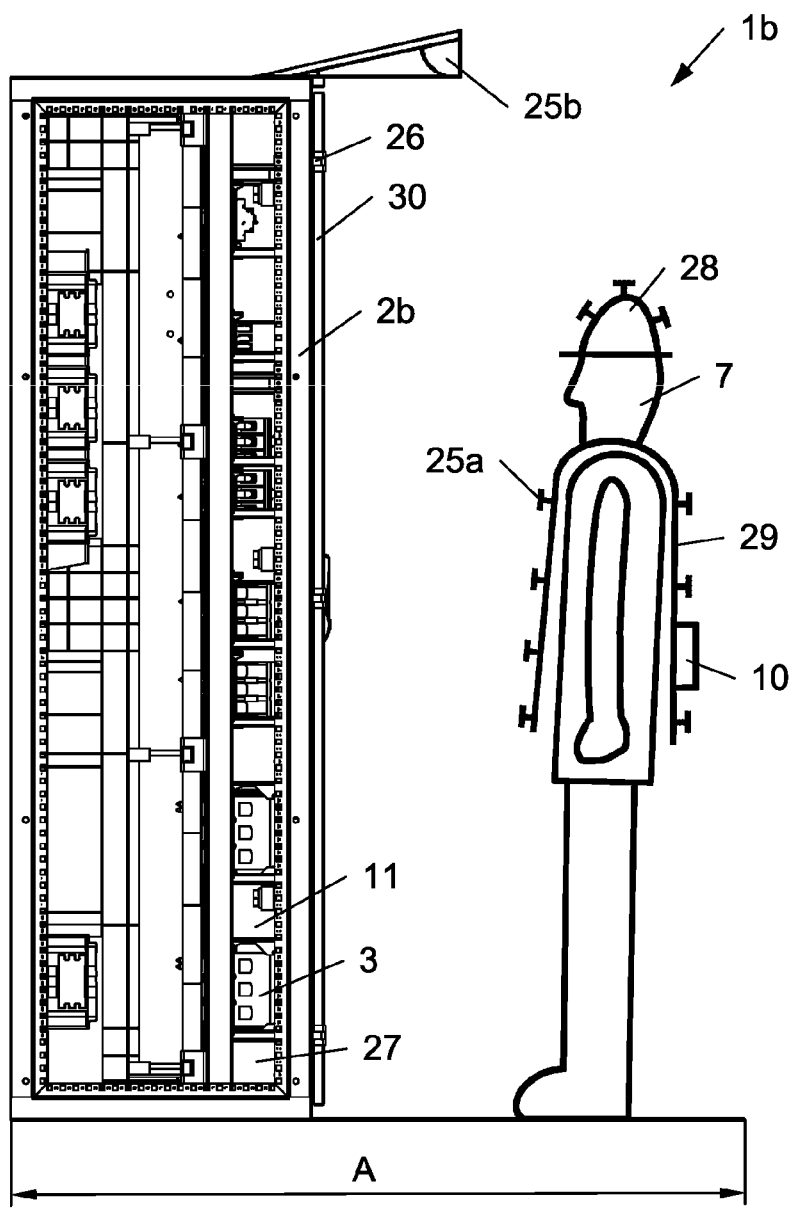
FIG. 9 is a schematic representation of an exemplary electrical installation having optical triggering devices which are operatively connected to a protective switch.

FIG. 9 now shows a further example of an electrical installation 1b, comprising a switch cabinet 2b and the protective switch 3 arranged in the switch cabinet 2b. The switch cabinet 2b can in turn be designed for an operating current of at least 250 amperes and/or for a maximum operating voltage of 1000 VAC or 1500 VDC. Furthermore, the electrical installation 1b has several optical triggering devices 25a, 25b which are operatively connected to the protective switch 3 and which are designed to trigger or switch off the protective switch 3 when an arc L is detected.

In addition, the electrical installation 1b has a detection device 26 for detecting an entry to or a request to enter a safe zone of the electrical installation 1b, as well as the electronic switch 27, which is connected to the detection device 26 and enables the protective switch 3 to be triggered or switched off by at least one of the optical triggering devices 25a, 25b if an entry or an entry request is detected and otherwise prevents the protective switch from being triggered or switched off.

The protective switch 3 can also have a switching input for triggering or switching off the protective switch 3. The optical triggering device 25a, 25b can have a switch output which is (operatively) connected to the switching input of the protective switch 3. If an arc L is detected, the optical triggering device 25a, 25b changes the state of the switch output and subsequently triggers the protective switch 3.

In the present example, several first optical triggering devices 25a are designed for attachment to the human body, and a second optical triggering device 25b is arranged on the outside of the switch cabinet 2b. The first optical triggering devices 25a can, as shown in FIG. 9, be arranged on a helmet 28, an armband and/or a cladding 29 and be worn by the person 7. In the present example, a special protective vest 29 is provided as a cladding, but it is also conceivable for the first optical triggering devices 25a to be arranged on a jacket or trousers.

In the example shown in FIG. 9, the detection device 26 is designed to detect a closing state of a switch cabinet door 30, specifically as a switching contact. In the example shown, the switch cabinet door 30 is completely open and can therefore only be seen from its narrow side. The electronic switch 27 connected to the detection device 26 is designed to enable the protective switch 3 to be triggered or switched off by the optical triggering devices 25a, 25b in the OPEN state of the switch cabinet door 30 and to prevent the protective switch from being triggered or switched off in the CLOSED state of the switch cabinet door 30. In the present example, an entry or access to the switch cabinet 2b is detected when the switch cabinet door 30 is opened.

The protective switch 3 is therefore only switched off or triggered by the optical triggering devices 25a, 25b when the switch cabinet door 30 is opened and an entry or access to the switch cabinet 2b is detected. Accordingly, a positive arc signal from the optical triggering devices 25a, 25b and an entry signal from the detection device 5 are logically linked with AND. The electronic switch 27, which is operatively connected to the protective switch 3 on the output side, can therefore be designed as a logical AND conjunction or at least act as such. The AND conjunction is thus logically inserted between the protective switch 3 and the optical triggering devices 25a, 25b.

The proposed measures ensure that the optical triggering devices 25a, 25b trigger the protective switch 3 only if there is an actual danger from the safe zone. In this example, there is a danger when the switch cabinet door 30 is open and thus passive measures (covers, housings, installations or the housing of the switch cabinet 2b as such) to protect against the effects of an arc fault L do not work or only work to a limited extent. If, on the other hand, there is no danger from the safe zone (because the switch cabinet door 30 is closed), the optical triggering devices 25a, 25b cannot trigger the protective switch 3. This prevents safety-critical circuits from being switched off due to an alleged emergency and when there is no actual danger to the person 7.

In the example shown in FIG. 9, several first optical triggering devices 25a distributed all over the person 7 and a second optical triggering device 25b are arranged on the outside of the switch cabinet 2b, which is aligned with the interior of the switch cabinet 2b. It would also be conceivable for the second triggering device 25b to be arranged inside the switch cabinet 2b or for several second triggering devices 25b to be provided. Similarly, it is conceivable for only a first optical triggering device 25a to be provided and, for example, to be attached to the helmet 28, which optical triggering device can, in particular, be aligned in the viewing direction of the person 7. By providing first and second optical triggering devices 25a and 25b, the person 7 is in any case very well protected in the event of an arc L occurring.

Nevertheless, it is conceivable for only first optical triggering devices 25a to be arranged on the person 7 (and for there to be no second optical triggering device 25b on or in the switch cabinet 2b), or for only at least one second optical triggering device 25b to be arranged on or in the switch cabinet 2b (and for there to be no first optical triggering device 25a on the person 7). The system is then simpler and functions in the way described above.

In the example shown in FIG. 9, the detection device 26 detects the closing state of the switch cabinet door 30. It is also conceivable, however, for the detection device 26 to alternatively or additionally detect the closing state of an entrance door to the electrical installation 1b.

It is also conceivable for the detection device 26 to be designed as a manually actuatable entrance switch for the switch cabinet 2b and/or for the electrical installation 1b, and for the electronic switch 27 connected to the detection device 26 to be designed to enable or otherwise prevent the triggering or switching off of the protective switch 3 by the optical triggering devices 25a, 25b when the entrance switch is actuated. Such an entrance switch can, for example, be designed as a key switch and be arranged at the entrance to the electrical installation 1b. The entrance switch can also be coupled to a lock which locks a door to the electrical installation 1b or a switch cabinet door 30. If the entrance switch is actuated, the lock opens and the optical triggering devices 25a, 25b are also activated, enabling the protective switch 3 to be switched off by the optical triggering devices 25a, 25b.

As a further alternative or additional possibility, it can be provided that the detection device 26 is designed to detect the presence of the optical triggering devices 25a, 25b in a danger zone A of the electrical installation 1b and the electronic switch 27 connected to the detection device 26 enables triggering or switch-off of the protective switch 3 by the optical triggering devices 25a, 25b if the optical triggering devices 25a, 25b are present in the danger zone A and otherwise prevents said triggering or switch-off.

For this purpose, the detection device 26 can be designed as a wireless detection receiver or connected to a wireless detection receiver. In particular, the detection device 26 can be connected to or realised by the wireless receiver 11.

The optical triggering devices 25a, 25b are recognised as being present in a danger zone A when a transmission signal caused by the optical triggering devices 25a, 25b produces a reception field strength in the detection receiver which exceeds a field strength threshold value. The danger zone A, in which the optical triggering devices 25a, 25b must be situated in order to trigger the protective switch 3, need not necessarily correspond to the reception zone of the wireless receiver 11 coupled to the switching input of the protective switch 3. For correct operation, it is necessary for said reception zone of the receiver 11 to cover the danger zone A, but the reception zone can also go beyond said danger zone A.

The technical teaching disclosed with respect to the detection device 26 for detecting the presence of the optical triggering devices 25a, 25b in a danger zone A of the electrical installation 1b is analogously also applicable to the voltage-measuring device 5/current-measuring device 14 and the transmitter 10. This means that the electrical installation 1a can also be designed to detect the presence of the voltage-measuring device 5/current-measuring device 14 or the transmitter 10 in a danger zone A of the electrical installation 1a. Accordingly, triggering or switch-off of the protective switch 3 is enabled by the voltage-measuring device 5/current-measuring device 14 when the voltage-measuring device 5/current-measuring device 14 and the transmitter 10 are present in the danger zone A, and otherwise said triggering or switch-off is prevented.

For the type of protective switch 3, the statements already made in relation to FIGS. 1 to 8 apply. This means that protective switch 3 of FIG. 9 can again be designed as a line protective switch 19, 23a . . . 23b, as an arc short-circuit switch 18a . . . 18b or as a combined line and arc short-circuit switch (see FIG. 8).

The detection of an arc can be performed purely optically, or an operating current-measuring device 21b is provided for measuring a current flowing through the protective switch 3, 19, 23a . . . 23b or through the electrical installation 1b, and an electronic switch 20 is provided which is connected to the operating current-measuring device 21b and enables the protective switch 3, 19, 23a . . . 23b to be triggered or switched off by the optical triggering device 25a, 25b only when the measured current exceeds an operating current threshold value and/or when an increase threshold value of a time derivative of the measured current is exceeded.

The operative connection between the protective switch 3 and the optical triggering devices 25a, 25b can in turn be produced wirelessly or by wire, as described above for the operative connection between the protective switch 3 and the voltage-measuring device 5/current-measuring device 14.

The combination of the system shown in FIGS. 1 to 7 for avoiding a harmful fault current and the system shown in FIG. 9 for avoiding an arc L protects the person 7 particularly well. It should be noted here that due to the better overview provided, not all of the elements worn by the person 7 in FIGS. 1 to 7 and elements explicitly shown there (measuring electrodes 4a, 4b, voltage-measuring device 5, armbands 6a, 6b, earth electrode 8, leg band 9, transmitter 10, current-measuring resistor 12, current-measuring device 14, etc.) are also shown in FIG. 9. In reality, however, these elements are present in a combination of the two systems. They can be worn simultaneously, or a certain system is arranged as needed on person 7.

The voltage-measuring device 5/current-measuring device 14 and the optical triggering devices 25a, 25b can in particular be operatively connected to the same protective switch 3. In this case, a, and the same, protective switch 3 is used to avert the dangers of several different types of fault, i.e. to prevent a harmful fault current passing through the person 7, to prevent an arc L, which can be harmful to the person 7, and of course to prevent overcurrents (in the case of a line protective switch) and also to prevent arcs L when no person 7 is present (in the case of an arc short-circuit switch).

In principle, however, the optical triggering devices 25a, 25b could also be operatively connected to another protective switch 3 than the voltage-measuring device 5/current-measuring device 14. It is also conceivable for the voltage-measuring device 5/current-measuring device 14 to be operatively connected to a first group of protective switches 3 and for the optical triggering devices 25a, 25b to be operatively connected to a second group of protective switches 3. Specifically, the two groups can also have an intersection.

Finally, it should be noted that the electrical installation 1a, 1b or the components thereof are not necessarily shown to scale and can therefore have different proportions. Furthermore, an electrical installation 1a, 1b can also comprise more or less components than shown. Position information (e.g. "top", "bottom", "left", "right", etc.) refers to the figure described in each case and must be adapted analogously to the new position in the event of a change of position. Finally, it should be noted that the above designs and further developments of the invention can be combined in any way.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrical installation, comprising:
   a switch cabinet;
   a protective switch arranged in the switch cabinet; and
   a cladding for attachment to a human body, the cladding comprising electrical conductors and a current-measuring device configured to measure a current flowing through the electrical conductors, the current-measuring device being operatively connected to the protective switch and configured to trigger or switch off the protective switch when a measured value exceeding a threshold value is detected, the current-measuring device being at least partially disposed on the cladding.

2. The electrical installation according to claim 1, wherein the protective switch has a switching input configured to trigger or switch off the protective switch,
   wherein the current-measuring device has a switch output which is connected to the switching input of the protective switch, and
   wherein the current-measuring device is configured to change a state of the switch output when the measured value exceeding the threshold value is detected and to subsequently trigger or switch off the protective switch.

3. The electrical installation according to claim 1, wherein the protective switch comprises a line protective switch, an arc short-circuit switch, or a combined line and arc short-circuit switch.

4. The electrical installation according to claim 1, further comprising two measuring electrodes configured for attachment to the human body and
   a) a voltage-measuring device arranged between the two measuring electrodes so as to measure a voltage between the two measuring electrodes, or
   b) the current-measuring device being arranged between the two measuring electrodes so as to measure a current flowing between the two measuring electrodes.

5. The electrical installation according to claim 4, wherein the cladding comprises at least two armbands/leg bands and one electrode of the two electrodes is arranged on each armband/leg band of the at least two armbands/leg bands, or
   wherein the cladding comprises a single armband/leg band and both measuring electrodes of the two electrodes are arranged at a distance from each other on the single armband/leg band.

6. The electrical installation according to claim 1, wherein the current-measuring device comprises a current-measuring resistor which is connected to the electrical conductors of the cladding and a voltage-measuring device configured to measure an electrical voltage drop at the current-measuring resistor, or wherein the current-measuring device comprises a ring-type transducer configured to measure an electromagnetic field caused by a current flowing through the electrical conductors of the cladding.

7. The electrical installation according to claim 1, wherein the electrical conductors provided in the cladding comprise electrically conductive wires, an electrically conductive braid, and/or an electrically conductive foil.

8. The electrical installation according to claim 1, wherein the electrical conductors of the cladding are connected to an earth potential.

9. The electrical installation according to claim 8, wherein the earth potential is arranged on an armband or a leg band of the cladding.

10. The electrical installation according to claim 8, wherein the measuring electrodes and/or the earth potential are arranged inside the cladding.

11. The electrical installation according to claim 1, wherein the cladding comprises a glove, jacket, overall, trousers, or protective suit.

12. The electrical installation according to claim 1, further comprising:
at least one optical triggering device which is operatively connected to the protective switch and which is configured to trigger or switch off the protective switch when an arc is detected;
a detection device configured to detect an entry to or a request to enter a safe zone of the electrical installation; and
an electronic switch which is connected to the detection device and configured so as to enable the protective switch to be triggered or switched off by the at least one optical triggering device when the entry or the entry request is detected, and otherwise configured to prevent the protective switch from being triggered or switched off by the at least one optical triggering device.

13. The electrical installation according to claim 12, wherein the electronic switch comprises a logical AND conjunction of a positive arc signal from the optical triggering device and an entry signal from the detection device, or is configured as such, and is operatively connected to the protective switch on an output side.

14. The electrical installation according to claim 12, wherein:
d) the detection device is configured to detect a closed state of a switch cabinet door and/or an entrance door to the electrical installation and the electronic switch connected to the detection device is configured to enable the protective switch to be triggered or switched off by the at least one optical triggering device in an OPEN state of the switch cabinet door/entrance door and to prevent the protective switch from being triggered or switched off by the at least one optical triggering device in a CLOSED state of the switch cabinet door/entrance door, and/or
e) the detection device comprises a manually actuatable entrance switch for the switch cabinet and/or for the electrical installation, and the electronic switch connected to the detection device is configured to enable the protective switch to be triggered or switched off by the at least one optical triggering device when the entrance switch is actuated and otherwise to prevent the protective switch from being triggered or switched off by the at least one optical triggering device, and/or
f) the detection device is configured to detect a presence of the at least one optical triggering device in a danger zone of the electrical installation, and the electronic switch connected to the detection device is configured to enable the protective switch to be triggered or switched off by the at least one optical triggering device when the optical triggering device is present in the danger zone and otherwise to prevent the protective switch from being triggered or switched off by the at least one optical triggering device.

15. The electrical installation according to claim 14, wherein
g) the at least one optical triggering device is configured for attachment to the human body, or
h) the at least one optical triggering device is arranged in the switch cabinet or outside the switch cabinet, or
i) a first optical triggering device is configured for attachment to the human body and a second optical triggering device is arranged in the switch cabinet or outside the switch cabinet.

16. The electrical installation according to claim 15, wherein the at least one optical triggering device is arranged on a helmet, an armband, and/or on the cladding.

17. The electrical installation according to claim 1, wherein the operative connection between the protective switch and the current-measuring device is established wirelessly or by wire.

18. The electrical installation according to claim 17, wherein a switch output of the current-measuring device comprises a wireless transmitter or is connected to a wireless transmitter,
wherein a switching input of the protective switch comprises a wireless receiver or is connected to a wireless receiver, and
wherein the wireless transmitter and the wireless receiver are configured to establish a wireless connection.

19. The electrical installation according to claim 17, wherein a switch output of the current-measuring device is connected electrically or by wire to a switching input of the protective switch.

20. The electrical installation according to claim 1, wherein the switch cabinet is configured for an operating current of at least 250 amperes and/or for an operating voltage of at most 1000 VAC or 1500 VDC.

21. The electrical installation according to claim 4, wherein
the electrical installation has, in case b), a current-measuring resistor which is electrically connected to the two measuring electrodes and a voltage-measuring device configured to measure an electrical voltage drop at the current-measuring resistor, or
the current-measuring device has a ring-type transducer configured to measure an electromagnetic field which is caused in case b) by a current flowing between the two measuring electrodes.

22. The electrical installation according to claim 4, wherein one of the two measuring electrodes in cases a) and b) is connected to an earth potential, or
wherein an earth electrode connected to an earth potential is provided which is configured for attachment to the human body.

23. A method for securing an electrical installation comprising a switch cabinet and a protective switch arranged in the switch cabinet, the method comprising:
determining, using a current-measuring device of the electrical installation, which is operatively connected to the protective switch, a current flowing through electrical conductors of a cladding, the current-measuring device being at least partially disposed on the cladding; and triggering or switching off, using the current-measuring device, the protective switch when a measured value exceeding a threshold value is detected.

24. The method according to claim 23, wherein the cladding is worn on a human body and the current flowing through the electrical conductors is determined.

25. The method according to claim 24, wherein the electrical conductors are connected to an earth potential.

26. The method according to claim 25, wherein two measuring electrodes are additionally attached to the human body and a) a voltage drop on the human body between the measuring electrodes or b) a current flowing between the measuring electrodes, is determined.

27. An electrical installation, comprising:
a switch cabinet;
a protective switch arranged in the switch cabinet;
a cladding having electrical conductors and a current-measuring device configured to measure a current flowing through the electrical conductors, the current-measuring device being operatively connected to the protective switch and configured to trigger or switch off the protective switch when a measured value exceeding a threshold value is detected;
at least one optical triggering device which is operatively connected to the protective switch and which is configured to trigger or switch off the protective switch when an arc is detected;
a detection device configured to detect an entry to or a request to enter a safe zone of the electrical installation; and
an electronic switch which is connected to the detection device and configured so as to enable the protective switch to be triggered or switched off by the at least one optical triggering device when the entry or the entry request is detected, and otherwise configured to prevent the protective switch from being triggered or switched off by the at least one optical triggering device.

28. The electrical installation according to claim 27, wherein the electronic switch comprises a logical AND conjunction of a positive arc signal from the optical triggering device and an entry signal from the detection device, or is configured as such, and is operatively connected to the protective switch on an output side.

29. The electrical installation according to claim 27, wherein:
d) the detection device is configured to detect a closed state of a switch cabinet door and/or an entrance door to the electrical installation and the electronic switch connected to the detection device is configured to enable the protective switch to be triggered or switched off by the at least one optical triggering device in an OPEN state of the switch cabinet door/entrance door and to prevent the protective switch from being triggered or switched off by the at least one optical triggering device in a CLOSED state of the switch cabinet door/entrance door, and/or
e) the detection device comprises a manually actuatable entrance switch for the switch cabinet and/or for the electrical installation, and the electronic switch connected to the detection device is configured to enable the protective switch to be triggered or switched off by the at least one optical triggering device when the entrance switch is actuated and otherwise to prevent the protective switch from being triggered or switched off by the at least one optical triggering device, and/or
f) the detection device is configured to detect a presence of the at least one optical triggering device in a danger zone of the electrical installation, and the electronic switch connected to the detection device is configured to enable the protective switch to be triggered or switched off by the at least one optical triggering device when the optical triggering device is present in the danger zone and otherwise to prevent the protective switch from being triggered or switched off by the at least one optical triggering device.

30. The electrical installation according to claim 29, wherein
g) the at least one optical triggering device is configured for attachment to the human body, or
h) the at least one optical triggering device is arranged in the switch cabinet or outside the switch cabinet, or
i) a first optical triggering device is configured for attachment to the human body and a second optical triggering device is arranged in the switch cabinet or outside the switch cabinet.

31. The electrical installation according to claim 30, wherein the at least one optical triggering device is arranged on a helmet, an armband, and/or on the cladding.

32. The electrical installation according to claim 28, wherein the operative connection between the protective switch and the current-measuring device and/or between the protective switch and the optical triggering device is established wirelessly or by wire.

33. The electrical installation according to claim 32, wherein a switch output of the current-measuring device and/or of the optical triggering device comprises a wireless transmitter or is connected to a wireless transmitter,
wherein a switching input of the protective switch comprises a wireless receiver or is connected to a wireless receiver, and
wherein the wireless transmitter and the wireless receiver are configured to establish a wireless connection.

34. The electrical installation according to claim 32, wherein a switch output of the current-measuring device and/or of the optical triggering device is connected electrically or by wire to a switching input of the protective switch.

* * * * *